June 6, 1967  R. L. GIRAUD  3,323,742

UNWINDER FOR REELS OF PRODUCTS IN STRIPS

Filed Oct. 21, 1965

INVENTOR
Robert Louis Giraud

Sparrow and Sparrow
ATTORNEYS 3,323,742
UNWINDER FOR REELS OF PRODUCTS IN
STRIPS
Robert Louis Giraud, Mont-Saint-Aignan, France, assignor to Parsons and Whittemore, Paris, France, a French company
Filed Oct. 21, 1965, Ser. No. 499,455
Claims priority, application France, Oct. 23, 1964, 7,071
5 Claims. (Cl. 242—58.6)

The present invention relates to an improved unwinder for reels of products in strips such as paper reels.

It is already known that unwinders without spindle, fitted with mobile arms with adjustable spacing and carrying pins which penetrate axially into the reel to be unwound to support it, are used. These unwinders allow to grasp and lift a reel that lies on the ground to put it into position to be unwound. However, these unwinders, in addition of being often heavy, and costly to manufacture, are unable to give safety to the reel and small movements parallel to the axis of unwinding, designed to compensate for the oscillatory transverse displacements of the strip being unwound.

The present invention aims to cope with these inconveniences.

According to the invention, the unwinder is equipped with at least two mobile arms fitted with pins to carry the reel to be unwound, the aforesaid arms being capable of rotating round a horizontal axis under the action of a jack to lift the reel and put it into unwinding position, the spacing of the aforesaid arms being adjusted by a two screws and nuts system which allows to fit this spacing to the width of the reel, the aforementioned system comprising a clutch that interlocks the movement of the screws to give occasionally to the reel a movement that is parallel to the axis of rotation of the aforesaid reel.

The invention also consists in certain other arrangements mentioned below and used preferably simultaneously with the main arrangements stated above.

The invention relates more particularly to certain other ways of application and manufacture of the above arrangements. It relates more particularly still, and as new industrial products, to unwinders thus improved, to the elements and tools peculiar to their manufacture, and also to machines or ranges comprising these unwinders.

Figure 1:
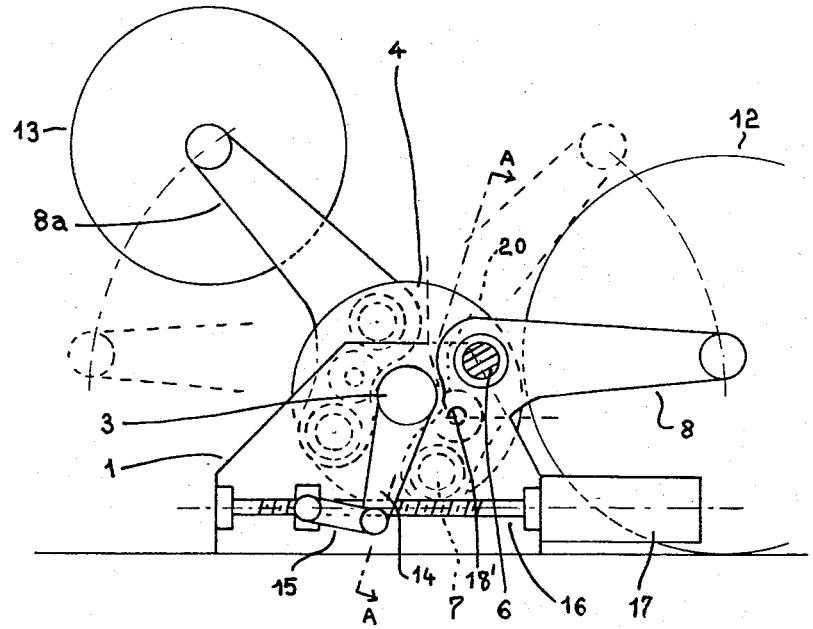
Figure 2:
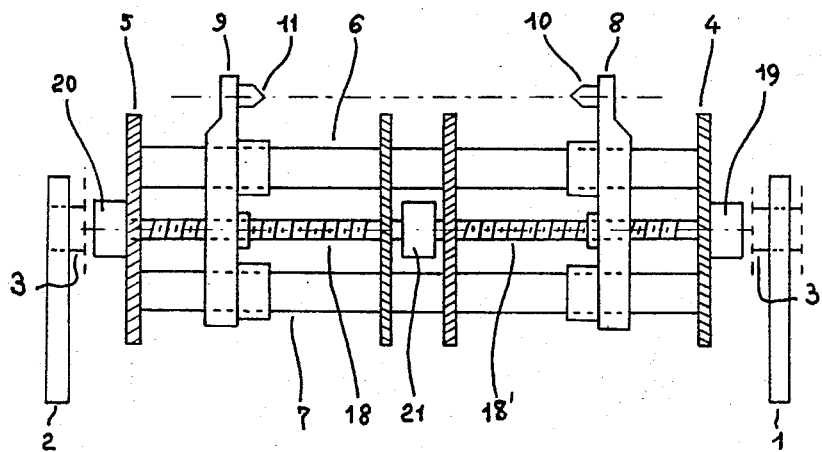

As a mere example and to facilitate the understanding of the invention, a description is given below of a particular method for working out the invention. This is diagrammatically outlined, with no limitation, in the attached drawing, in which:

FIGURE 1 is a view from the end, in partial elevation and section, of an unwinder according to the invention; and FIGURE 2 is a partial section of this unwinder, along the plane A—A of FIGURE 1.

If it is intended to manufacture an unwinder according to the invention, and, more especially, according to its methods of application and also to the ways of realization of its various parts, to which it appears that preference should be given, the procedure is in the following or in a similar manner.

The unwinder consists of two supports 1 and 2, which are fixed to the ground or to a framework in which a shaft 3 carrying two flanges 4 and 5 can rotate. On these flanges bars are rigidly fixed such as 6 and 7, on which the arms 8 and 9, fitted with pins 10 and 11, to carry the reel to be unwound, can slide. Two of these reels can be mounted on the unwinder; the reel 12, between the arms 8 and 9, is shown lying on the ground; the reel 13, shown in unwinding position, is held by two other arms such as 8a, similar to the aforementioned arms 8 and 9, and mounted in the same way on parallel bars 6 and 7.

The positioning of the reels for unwinding is carried out by rotating the arms, the flanges 4 and 5 and the shaft 3 by means of the crank 14 actuated, through the push-rod 15, by a screw and nut jack 16, driven by a rotating motor 17, for instance electric. A hydraulic cylinder opeprating push rod 15 may be substituted for this electrically operated system.

The spacing of the arms, such as 8 and 9, is adjusted by two independent screws of same pitch 18 and 18′, each of them being actuated by a motor with speed-reducing gear, respetcively 19 and 20, fixed on the flange 4 or 5. The adjustment of the spacing of arms 8 and 9 is achieved by rotation of these screws in contrary directions.

According to a main feature of the invention, the two screws 18 and 18′ can be interlocked by means of a clutch 21. By coupling these two screws with the clutch 21 and actuating the motors 19 and 20 in the required direction, it is possible to give to the two arms 8 and 9 and to the reel 12, held by this arm, the same movement of translation parallel to the axis of shaft 3. This movement, suitably controlled, allows, inter alia, to compensate for the oscillating transverse displacements of the strip being unwound.

The arms such as 8a, carrying the reel 13, are of course displaced by an identical machinery, whilst the adjustments of the spacing between arms 8 and 9, and arms such as 8a, can be different.

Another advantage of the unwinder described above is that the reels can be brought along by means of a roller or trolley conveyor, and grasped directly by the arms without any complementary handling.

It must be understood that the invention is not limited to the aforementioned methods of application and realization, and that it also comprises any of their variants.

What I claim is:

1. An unwinder for reels of products in strips comprising at least two mobile arms having pins for supporting the reels to be unwound, a horizontal axis-carrying discs, said arms arranged to be rotated about said horizontal axis, a jack connected to said axis for lifting said reels into the unwinding position, two pairs of screw shafts having the same pitch and having nuts thereon, said shafts extending axially between said discs, the spacing of said arms being adjustable by said two screw shafts and nuts whereby the spacing may be adjusted to the width of said reels, and a clutch on each pair of said shafts interlocking the movement of said pair of shafts, whereby said shafts may be rotated to shift said arms and said reels parallel to the axis of rotation of said reels.

2. An unwinder according to claim 1, and comprising bars fixed on said discs on said horizontal axis, said bars arranged for slidably supporting said arms.

3. An unwinder according to claim 1, and said jack comprising a screw and a nut and a rotating motor.

4. An unwinder according to claim 1, and said jack comprising a hydraulic cylinder.

5. An unwinder according to claim 1, and comprising at least one motor to actuate said screw shafts.

References Cited

UNITED STATES PATENTS

| 2,499,562 | 3/1950 | Behrens | 242—58.6 |
| 2,561,146 | 7/1951 | Sieg | 242—58.6 |

FRANK J. COHEN, *Primary Examiner.*

LEONARD D. CHRISTIAN, *Examiner.*